US008606636B1

United States Patent
Keoshkerian

(10) Patent No.: US 8,606,636 B1
(45) Date of Patent: Dec. 10, 2013

(54) RECOMMENDATIONS BASED ON ENVIRONMENTAL VARIABLES

(75) Inventor: Matthew A. Keoshkerian, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 321 days.

(21) Appl. No.: 12/836,077

(22) Filed: Jul. 14, 2010

(51) Int. Cl.
*G06Q 30/00* (2012.01)
*G06Q 30/02* (2012.01)
(52) U.S. Cl.
CPC ........ *G06Q 30/0252* (2013.01); *G06Q 30/0261* (2013.01)
USPC ...................................... 705/14.5; 705/14.58
(58) Field of Classification Search
USPC ............................................ 705/14.5, 14.58
See application file for complete search history.

(56) References Cited

U.S. PATENT DOCUMENTS

| 2001/0032127 A1* | 10/2001 | Lewis ............................. 705/14 |
| 2010/0023407 A1* | 1/2010 | Grady et al. ............... 705/14.66 |
| 2010/0312624 A1* | 12/2010 | Bilenko ....................... 705/14.5 |

OTHER PUBLICATIONS

Twitter About Page, retrieved on Jul. 30, 2010. Published on the Internet at http://twitter.com/about. pp. 1-4.
foursquare.com, Home Page, retrieved on Aug. 11, 2010. Published on the Internet at http://foursquare.com. p. 1.

* cited by examiner

*Primary Examiner* — James W Myhre
(74) *Attorney, Agent, or Firm* — Thomas | Horstemeyer, LLP

(57) ABSTRACT

Disclosed are various embodiments for generating product recommendations. A user profile associated with a user is retrieved and profile data is extracted from the user profile. Environmental variables associated with the user and/or the location of the user are retrieved and/or detected. Product recommendations related to the user profile data and the environmental variables are generated.

18 Claims, 8 Drawing Sheets

RECOMMENDATIONS BASED ON ENVIRONMENTAL VARIABLES

BACKGROUND

Users of an electronic commerce system may receive product recommendations from the electronic commerce system or related applications. These recommendations can be based on purchasing history, browsing history and the like. Users may seek product recommendations that are based on additional variables and/or dimensions that are not provided by many electronic commerce systems or recommendation engines.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Disclosed herein are systems and methods of generating product recommendations that are based on at least one of data stored within a user profile and environmental variables that can be detected. As discussed herein, a product can include any good or service that can be made accessible via an electronic commerce system. Accordingly, an environmental variable can include information that can be retrieved and/or determined that can reveal additional information about a user so that product recommendations can be more tailored to the user relative to prior art systems.

Figure 1:
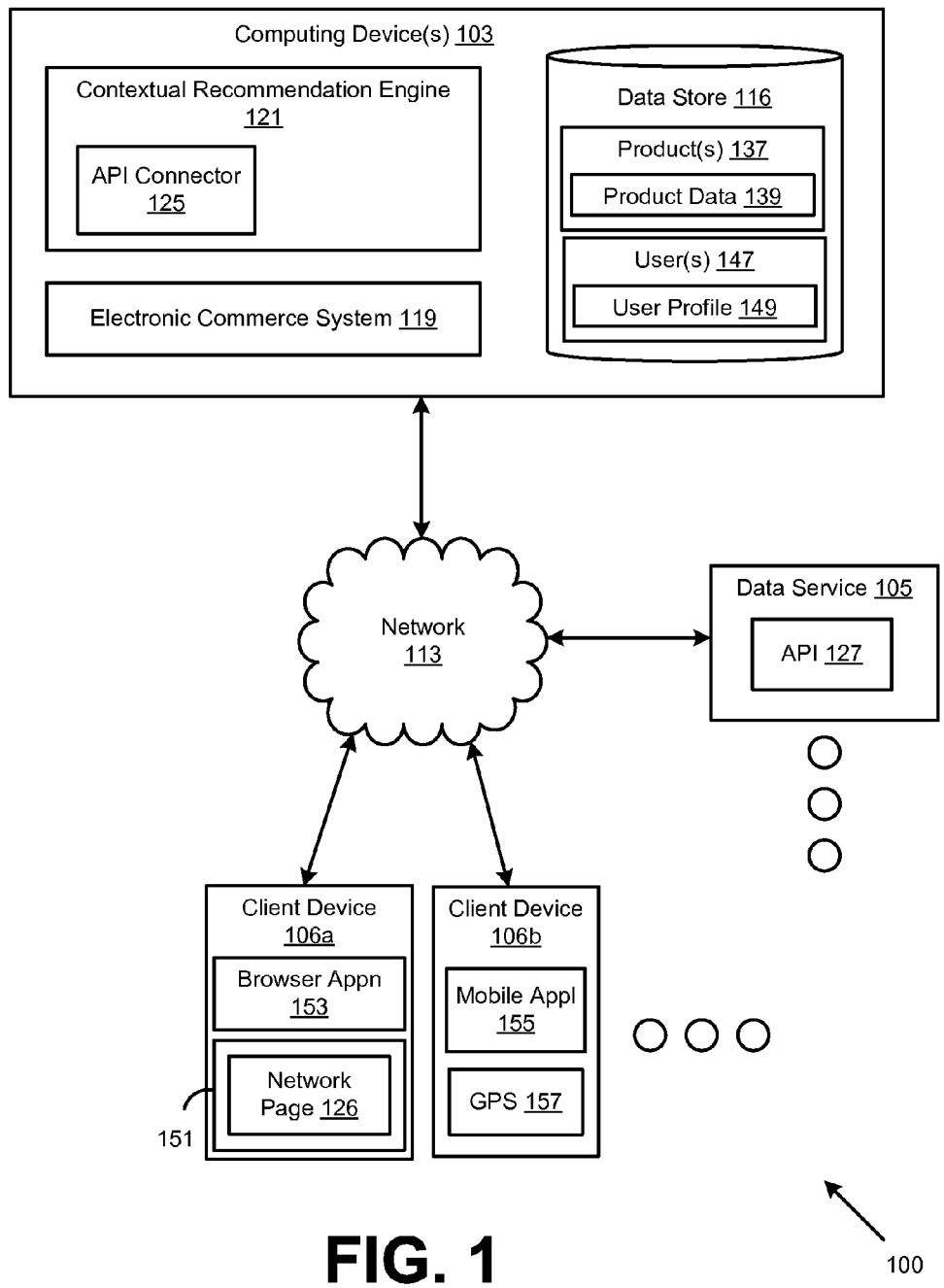
FIG. 1 is a drawing of a networked environment according to various embodiments of the present disclosure.

With reference to FIG. 1, shown is a networked environment 100 according to various embodiments. The networked environment 100 includes at least one computing device 103 in communications with at least data service 105 as well as at least one client 106. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, an electronic commerce system 119, the contextual recommendation engine 121, and other systems, applications, services, processes, engines, or functionality not discussed in detail herein. The electronic commerce system 119 is executed in order to facilitate the viewing and/or purchasing of items and products over the network 113. The electronic commerce system 119 can direct the shipment and/or delivery of products to a customer from a fulfillment center or the like. The electronic commerce system 119 also performs various backend functions associated with the online presence of a merchant in order to facilitate the online purchase of items as will be described.

For example, the electronic commerce system 119 generates network pages, such as web pages or other types of network content, that are provided to client devices 106 in response to requests for the purposes of selecting items for purchase, rental, download, lease, or other form of consumption and to perform other tasks as will be described. In other embodiments, the electronic commerce system 119 facilitates the generating of data for display on a user interface rendered by another type of application executed on a client device 106.

The contextual recommendation engine 121 facilitates generating recommendations for products available via the electronic commerce system 119 on behalf of users. The contextual recommendation engine 121 can generate product recommendations for products available via the electronic commerce system 119 or elsewhere that are based on information about the activity of a user within the electronic commerce system 119 as well as environmental variables related to the user that can be retrieved from or detected external to the electronic commerce system 119. In one embodiment, such an environmental variable can be a location of the user. Depending on the location of the user, the contextual recommendation engine 121 can generate product recommendations that can be transmitted to the user via the electronic commerce system 119 that are relevant to the location. For example, if the user is traveling in a city away from home, the contextual recommendation engine 121 can generate recommendations that are relevant to the city that also take into account the fact that the user is away from home.

A data service 105 can be implemented on one or more computing device and can include any network accessible service that provides data to the contextual recommendation engine 121 on which recommendations can be based and/or refined. As one example, a data service 105 can include a social networking system associated with a user of the electronic commerce system 119. As another example, the data service 105 can include a service that provides information about weather or events occurring in various locations. Accordingly, the contextual recommendation engine 121 can retrieve information from one or more data services 105 from which recommendation can be generated and/or refined. A data service 105 can also include a microblogging service, a ticketing service from which tickets can be procured on behalf of a user, a travel site, and any other service and/or site. A data service 105 can include a service and/or site with which a user has an account, such as a social networking system, so that information about the user can be retrieved from the data service 105. A data service 105 can also include a service from which general information that is not specific to a user can be retrieved, such as a weather data service.

Accordingly, a data service 105 can include any service from which data can be retrieved that is not specific to a user's profile and/or interactions with the electronic commerce system 119, and with which product recommendations generated by the contextual recommendation engine 121 can be refined. In other words, a data service 105 can provide environmental variables, such as location and weather, from which product recommendations can be generated and/or refined. Other examples of a data service 105 should be appreciated by a person of ordinary skill in the art.

Accordingly, the contextual recommendation engine 121 can include an application programming interface (API) connector 125 that allows the contextual recommendation engine 121 to interact with an API 127 provided by a data service 105. As an example, a location based social networking service can provide an API with which data can be retrieved regarding users of the service. For example, a location based social networking service can permit users to "check in" at a geographic location in order to interact with other users located nearby or to interact with other users with whom he or she is affiliated within the service. Therefore, in this example, the API connector 125 can retrieve data regarding a user from the location based social networking service, from which product recommendations are generated by the contextual recommendation engine 121. As another example, a weather data service can provide information regarding weather conditions of various geographic locations. Accordingly, the API connector 125 can retrieve weather information from the API 127 of the data service 105 from which product recommendations can be generated.

With regard to the data store 116, the data stored therein can include, for example, a catalog that includes a listing of various products 137 that are available for browsing and/or purchasing within the electronic commerce system 119. The products 137 in the catalog of the data store 116 can also be associated with the product data 139, which can be stored in various forms as can be appreciated. The product data 139 can include stock keeping unit (SKU) identifiers, model numbers, serial numbers, product attributes, product descriptions, other products with which the product is associated, etc. Additionally, the product data 139 can include entries that identify a product class and/or hierarchy in which the product 137 can be classified.

The data store 116 can also include data about users 147 of the electronic commerce system 119. In some embodiments, each user 147 can be associated with a user profile 149 that can contain additional data about the user that can facilitate the generating of product recommendations. As a non-limiting example, the purchasing history of the user 147 can be stored in a user profile 149, from which product preferences and/or interests can be determined by the contextual recommendation engine 121. As another example, the browsing history of the user 147 can be stored in a user profile 149, which can store data regarding the products the user has viewed and/or in which the user has expressed an interest. The user profile 149 can also store data regarding a location of the user. For example, the user profile 149 can store addresses that are associated with the user. In some embodiments, a user may designate an address that is a home address to which purchases can be shipped. In other embodiments the user may simply designate addresses to which purchases are shipped, but may not designate an address as a home address.

A user profile 149 associated with a user may also contain information regarding data services 105 with which a user is associated with. As one example, a user of the electronic commerce system 119 may also have an account within a social networking service. Accordingly, the user profile 149 can contain authentication information, an API token, a unique identifier for the user or other information allowing retrieval of data from the social networking service regarding the user. In one embodiment, the user can authorize the contextual recommendation engine 121 to access the social networking system to retrieve information about the user. In another embodiment, the user profile 149 can contain a username or information about an identity of the user in the social networking system, and the contextual recommendation engine 121 can retrieve publicly available information from the social networking system about the user.

As another example, a user of the electronic commerce system 119 may have an account with a location based social networking system that allows the user to interact with other users based upon location. Accordingly, the user profile 149 can contain information regarding an account of the user in the location based social networking system provided by the user that allows the contextual recommendation engine 121, via the API connector 125, to retrieve information about the location of the user from the location based social networking system. As yet another example, the user profile 149 can store information about an account of the user in a blogging service, a microblogging service and/or social networking system in which the user publishes content, and the contextual recommendation engine 121 can retrieve information regarding the user via the API connector 125 and refine and/or generate product recommendations for products available via the electronic commerce system 119. Other examples of data that can be stored in a user profile 149 that can be associated with a user should be appreciated.

The client device 106 is representative of a plurality of client devices 106 that may be coupled to the network 113.

The client device 106 may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106a includes a display device 151 upon which various network pages 126 and other content may be rendered.

The client device 106a may be configured to execute various applications such as a browser application 153 and/or other applications. The browser application 153 may be executed in a client device 106, for example, to access and render network pages 126, such as web pages, or other network content served up by the computing device 103 and/or other servers. The client device 106 may be configured to execute applications beyond browser application 153 such as, for example, an email client for receiving email generated by the electronic commerce system 119, instant message applications, an application specifically tailored to access resources of the computing device 103, and/or other applications as can be appreciated. In embodiments of the present disclosure, a user on a client 106 can purchase and/or view products via the electronic commerce system 119 executed by the computing device 103 by manipulating a user interface rendered on the client 106.

The client device 106b can also include a mobile device on which a browser application 153 and/or a mobile application 155 configured to access the computing device 103 can be executed. The client 106b may comprise a mobile device including cellular telephone, location detection hardware, and software components. Accordingly, the mobile device client 106b can detect the location of a user using the client 106b, which can be incorporated into various location based services and applications executed thereon. In one example, global positioning system 157 (GPS) functionality provided by the client 106b can provide a location of the client to the mobile application 155, which can in turn transmit a location of the client to the computing device 103. In one embodiment, the contextual recommendation engine 121 can utilize location based services and applications executed on the client 106b to determine a location of the user and generate recommendations.

The mobile application 155 can comprise a special purpose application tailored to interact with the electronic commerce system 119. As one example, the mobile application 155 can include client side code that enhances a user experience by providing more complex user interface elements and other functionality and facilitates interaction with the electronic commerce system 119. For example, the mobile application 155 can facilitate the providing of location based services (e.g., GPS 157) in conjunction with the contextual recommendation engine 121 by providing access to the location based services provided in the client 106b hardware.

Next, a general description that provides some examples of the operation of the various components of the networked environment 100 is provided. The following discussion includes non-limiting examples of the generating of recommendation based on user profile 149 data as well as environmental variables retrieved from data services 105. The electronic commerce system 119 can allow a user on a client 106 to view, browse, and/or purchase products. In embodiments of this disclosure, the contextual recommendation engine 121 can generate product recommendations for the user. As noted above, these product recommendations can be based on user profile 149 data, which contains data regarding interactions of the user within an electronic commerce system 119.

The contextual recommendation engine 121 can generate product recommendations for products available via the electronic commerce system 119 based at least upon user profile 149 data, which, as noted above, can include purchase history, browse history, and other user profile data such as age, product interests, etc. Product recommendations can be supplemented and/or refined by taking into account environmental variables such as location, weather, etc. As one example, the contextual recommendation engine 121 can detect a location of the user, which can be accomplished via IP network location techniques and/or a location provided by the user or the client 106 employed by a user interacting with the electronic commerce system 119. As another example, a location of the user can be retrieved from a location based social networking system, such as a data service 105 in the networked environment 100 of FIG. 1, via an API 127 provided therein.

Accordingly, in one embodiment, the contextual recommendation engine 121 can attempt to determine whether the user is away from home and generate product recommendations that take into account that the user is away from home. In one example, the contextual recommendation engine 121 can detect whether the user is away from home by determining whether an address designated in a user profile 149 as a home address is located in a geographic area that is sufficiently different from the present location of the user. In another example, the contextual recommendation engine 121 can retrieve a purchase history associated with the user from the user profile 149 data and determine whether a percentage of orders above a predetermined threshold are shipped to a particular address and/or a particular geographic area in an attempt to determine a home geographic area of a user. As one example, if a majority of orders submitted by a user in an electronic commerce system 119 are associated with a particular shipping address, the contextual recommendation engine 121 can infer that the address is the home address of the user.

Upon detection of a location of the user, the contextual recommendation engine 121 can make recommendations tailored to the location of the user. As one example, if the contextual recommendation engine 121 determines the location of the user via a data service 105 implementing a location based social networking service, the contextual recommendation engine 121 can then generate recommendations of products that take into account other environmental variables in addition to location. The contextual recommendation engine 121 can extract weather conditions associated with the location of the user from an API 127 associated with a weather data service 105 and generate recommendations based on present and/or predicted weather conditions. As an example, if the contextual recommendation engine 121 determines that rainy weather conditions exist in the location of the user, the contextual recommendation engine 121 can generate product recommendations based upon the purchasing history, the browsing history, and/or location for products that the user may desire in rainy conditions. In this example, the contextual recommendation engine 121 can extract information about events in a particular geographic area that are occurring indoors, and transmit these recommendations to the user via a client 106.

Additionally, these product recommendations that are augmented and/or refined based on location and other environmental variables can take into account whether the user is away from home. In the above example, the contextual recommendation engine 121, via the API connector 125, can determine that a user is traveling if the location of the user is different than a geographic area of the home address of the user. Accordingly, if the contextual recommendation engine 121 also detects via a weather data service 105 that it is raining in the location of the user, the contextual recommendation engine 121 can generate product recommendations for wet weather gear and/or indoor activities. Other variations of the above should be appreciated, and the above example is intended as but one example of the functionality of the contextual recommendation engine 121.

Figure 2:
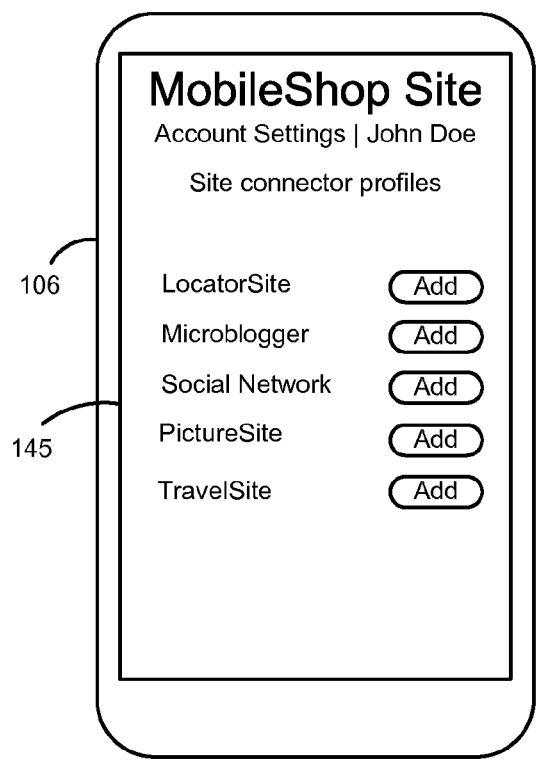
FIG. 2 is a drawing of an example of a user interface rendered by a client in the networked environment of FIG. 1 according to various embodiments of the present disclosure.

Referring next to FIG. 2, shown is an example user interface that can be rendered by a mobile application 155 and/or a network page 126 rendered by a browser application 153 associated with a client 106 in the networked environment 100 of FIG. 1. FIG. 2 illustrates an example user interface rendered on a client 106 in which a user can associate various data services 105 for which the user may have an account with a user profile 149 associated with the electronic commerce system 119. In the depicted example of a mobile application 155 executed on a client 106, the user can manipulate a user interface provided by the mobile application 155 and activate one of the user interface elements to add a profile associated with a data service 105 to a user profile 149.

Figure 3:
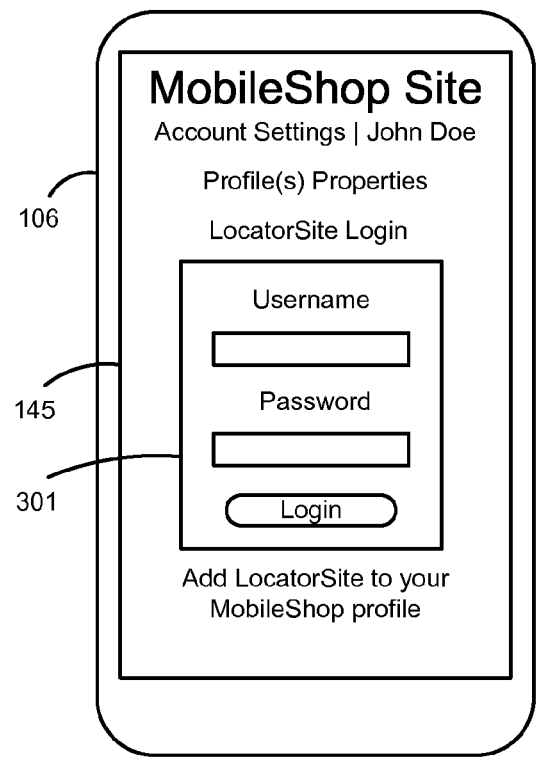
FIG. 3 is a drawing of an example of a user interface rendered by a client in the networked environment of FIG. 1 according to various embodiments of the present disclosure.

Accordingly, FIG. 3 continues the example of FIG. 2. FIG. 3 depicts a mobile application 155 rendering a user interface that contains a data service 105 authentication module, which can facilitate associating an account of a user in the data service 105 with a user profile 149. In this example, an account of a user in a location based social networking service implemented by a data service 105 is associated with a user profile 149. Accordingly, in the depicted example, the site connector module 301 can facilitate adding such an account to the user profile 149 so that the contextual recommendation engine 121 can retrieve information about the location of the user from the location based social networking service in order to generate product recommendations on behalf of the user. The site connector module 301 can be a user interface element provided by an API 127 of a data service 105 that allows a user to connect an account in the data service 105 with the user profile 149 accessible via the electronic commerce system 119.

Figure 4:
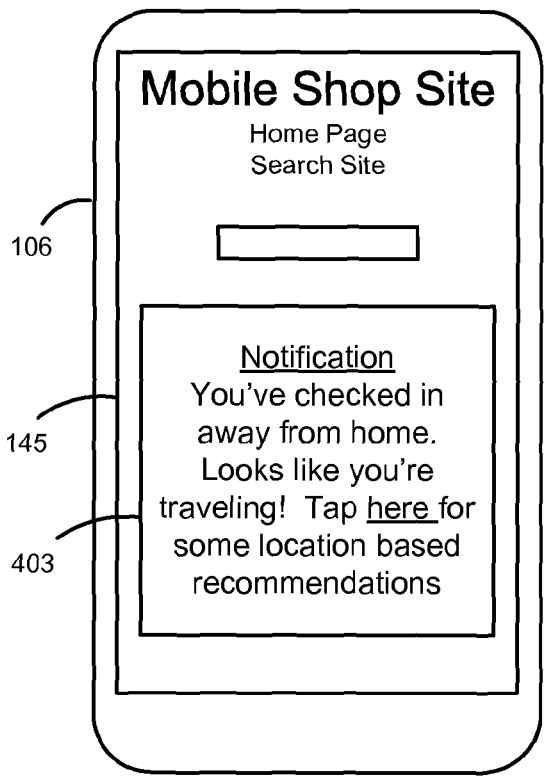
FIG. 4 is a drawing of an example of a user interface rendered by a client in the networked environment of FIG. 1 according to various embodiments of the present disclosure.

Turning now to FIG. 4, shown is a user interface that can be rendered in a mobile application 155 and/or a browser application 153 that continues the example of FIGS. 2 and 3. FIG. 4 depicts an example of the contextual recommendation engine 121 determining that the user, based upon information retrieved from a location based social networking system implemented by a data service 105, may be traveling away from home. In such a case, the contextual recommendation engine 121 may make product recommendations for products that can be purchased via the electronic commerce system 119. In the depicted example, a user has, via a location based social networking system, "checked in" at a location. Accordingly, the contextual recommendation engine 121, via the API connector 125 can retrieve location information about the user from the API 127 of the data service 105 associated with the location based social networking system and generate a notification user interface element 403 that alerts the user that the contextual recommendation engine 121 has generated product recommendations that are based on information in a user profile 149 as well as environmental variables, which in this example include the location of the user. It should also be appreciated that the location of the user can be determined via IP network location techniques and/or location detection capabilities (e.g., GPS 157) associated with a client 106.

Additionally, in the depicted non-limiting example, the contextual recommendation engine 121 can determine whether the user is traveling and/or away from a geographic area associated with a home address. Accordingly, in FIG. 5, which continues the example of FIG. 4, the contextual recommendation engine 121 has determined that the user is located in a geographic area that is away from a home address. Accordingly, the contextual recommendation engine 121 can generate product recommendations that are based upon information in the user profile 149, the location of the user, the fact that the user may be traveling, and other environmental variables that can be retrieved from various data services 105.

Figure 5:
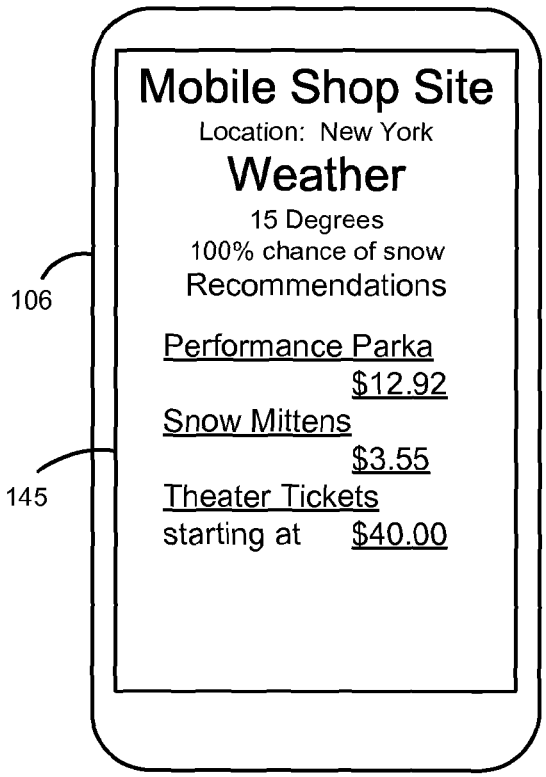
FIG. 5 is a drawing of an example of a user interface rendered by a client in the networked environment of FIG. 1 according to various embodiments of the present disclosure.

In the example of FIG. 5, the contextual recommendation engine 121 has generated product recommendations that take into account weather conditions in the location of the user by retrieving weather information from a weather data service 105. Accordingly, in this non-limiting example, the contextual recommendation engine 121 can determine, based upon a home address associated with the user, whether product recommendations for weather specific gear are appropriate product recommendations. As one example, if the home address of the user is located in a warm weather climate, the contextual recommendation engine 121 can recommend cold weather gear as product recommendations displayed in a mobile application 155 and/or browser application 153 on a client if the user is now located in a cold weather climate. Additionally, the contextual recommendation engine 121 can make this recommendation if it is determined, by analyzing a purchasing history associated with a user profile 149 of the user 147, that the user has not purchased cold weather gear in the past.

Alternatively, if the user has recently purchased cold weather gear via the electronic commerce system 119, the contextual recommendation engine 121 can make other product recommendations because it can determine that the user may not need cold weather gear. In the depicted example, the contextual recommendation engine 121 can also recommend other products and/or services that can be based on environmental variables and information retrieved from data services 105 associated with the user as shown. In the illustrated example, the contextual recommendation engine 121 can generate product recommendations for theater tickets by determining from social networking systems, microblogging networks, etc., that a user may have an interest in theater. In this example, the contextual recommendation engine 121 can perform natural language and/or relevance based searching on content and/or interests published by the user in social networking systems, microblogging networks, or other data services 105 in order to determine that the user may have an interest in the depicted theater ticket product recommendation that can be purchased via the electronic commerce system 119.

Figure 6:
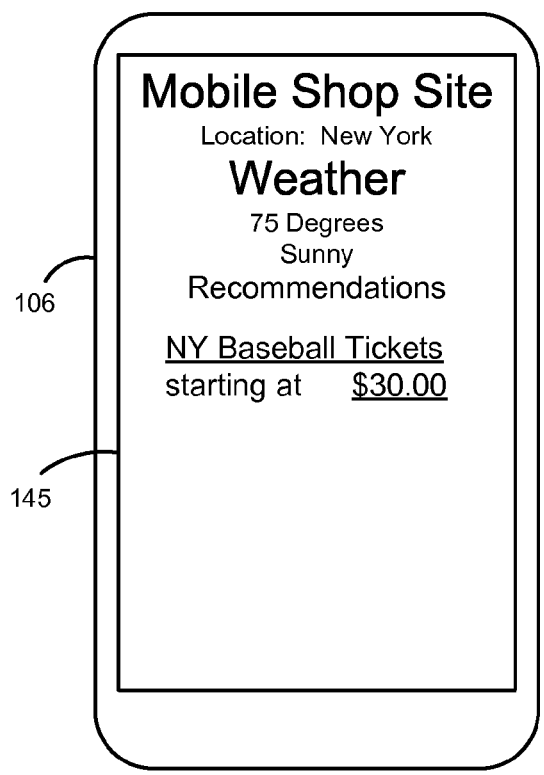
FIG. 6 is a drawing of an example of a user interface rendered by a client in the networked environment of FIG. 1 according to various embodiments of the present disclosure.

FIG. 6 shows an alternative example that continues the example of FIG. 4. In the example of FIG. 6, the contextual recommendation engine 121 can generate product recommendations for the same user that vary based upon environmental variables such as weather. In the depicted example, the weather conditions retrieved by the contextual recommendation engine 121 from a weather information data service 105 associated with the location of the user can yield varying product recommendations. Accordingly, in the depicted example, the contextual recommendation engine 121 can determine, based upon data retrieved from the user profile 149 and/or other data services 105 associated with the user, that the user may have an interest in baseball and/or a particular baseball team, and based upon favorable weather conditions, can recommend baseball tickets that can be purchased via the electronic commerce system 119.

Figure 7:
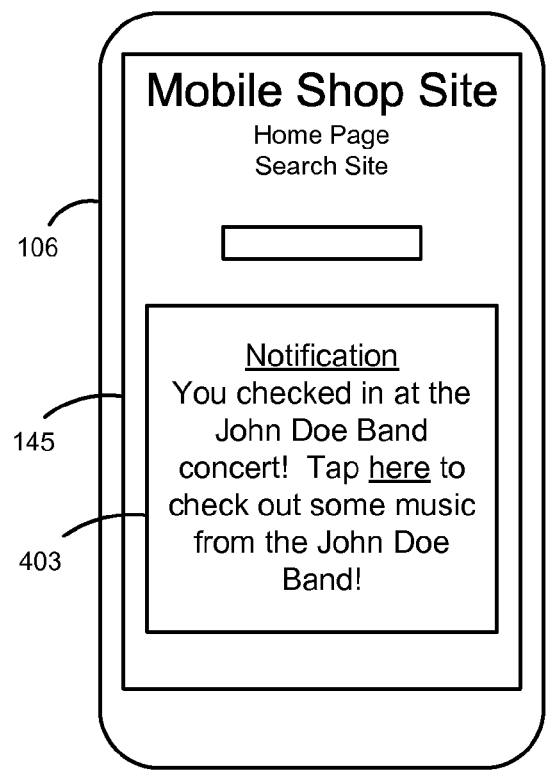
FIG. 7 is a drawing of an example of a user interface rendered by a client in the networked environment of FIG. 1 according to various embodiments of the present disclosure.

FIG. 7 provides an alternative example of the contextual recommendation engine 121 generating product recommendations based on environmental variables as well as information retrieved from a user profile 149 associated with a user. In the example of FIG. 7, the contextual recommendation engine 121 can determine, by retrieving location information about the user from a location based social networking service implemented by a data service 105 and/or location detection mechanisms associated with a client 106, that a user is present at or near a particular event and make corresponding product recommendations. In the depicted example of FIG. 7, the contextual recommendation engine 121 can determine that the location of the user corresponds to a particular event by retrieving event info from a location based social networking service or other data service 105, and make corresponding product recommendations as shown. Accordingly, the contextual recommendation engine 121 can facilitate generating the product recommendations contained in and/or accessible from the notification user interface element 403 rendered on the client 106. With regard to the examples illustrated in FIGS. 2-7, it should be appreciated that the depicted user interfaces and functionality depicted therein are non-limiting examples that are presented to illustrate the operation of the contextual recommendation engine 121 and the various ways it can generate product recommendations based upon a user profile 149 and environmental variables. There are other variations and additional examples consistent with this disclosure as can be appreciated.

Figure 8:
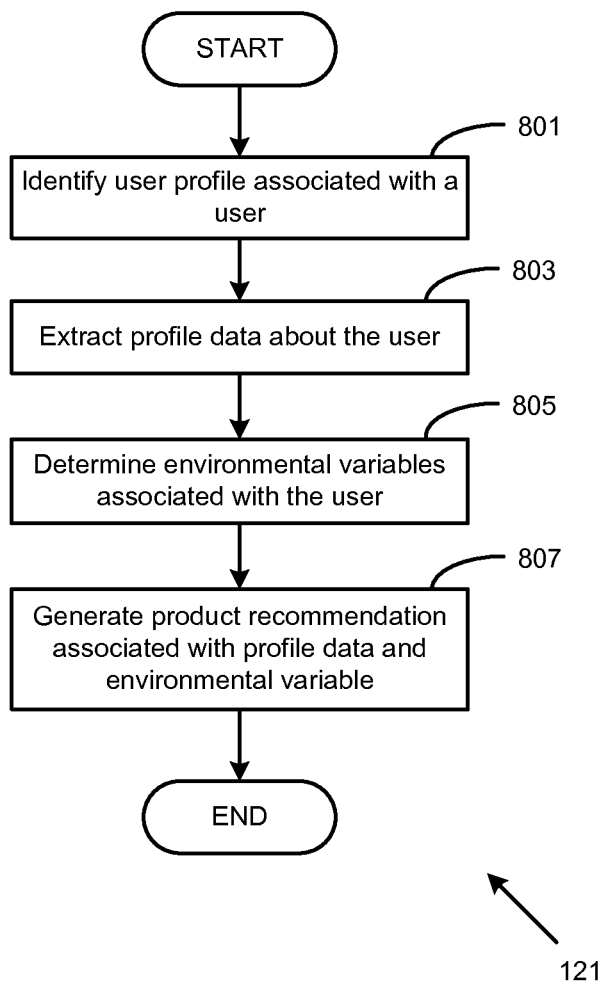
FIG. 8 is a flowchart illustrating one example of functionality implemented as portions of contextual recommendation engine executed in a computing device in the networked environment of FIG. 1 according to various embodiments of the present disclosure.
Figure 9:
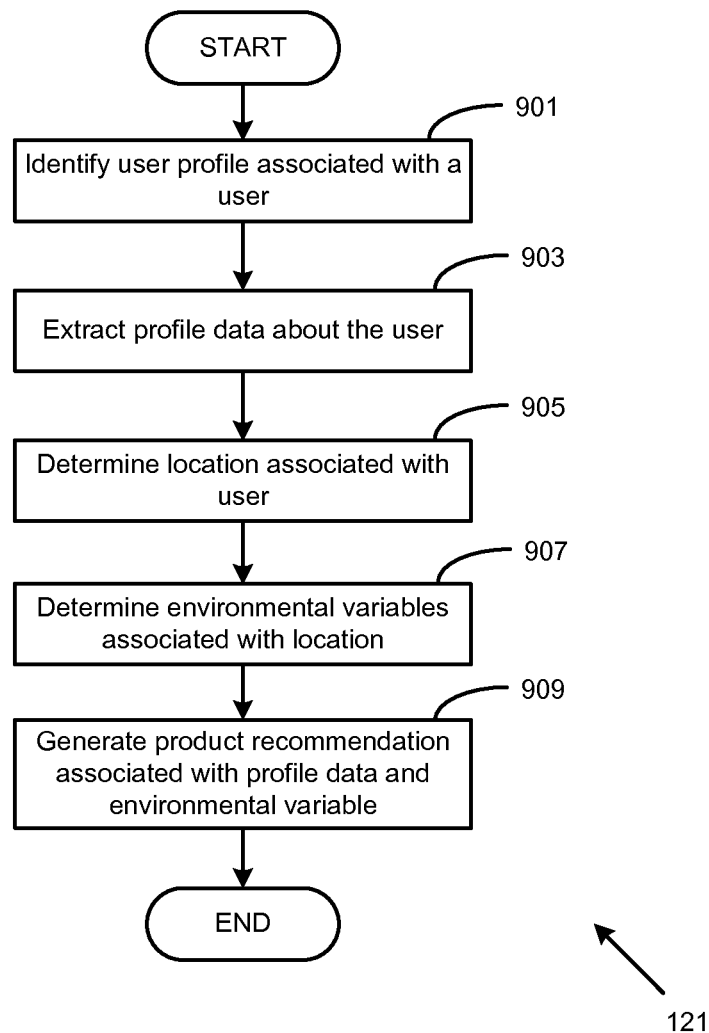
FIG. 9 is a flowchart illustrating one example of functionality implemented as portions of contextual recommendation engine executed in a computing device in the networked environment of FIG. 1 according to various embodiments of the present disclosure.
Figure 10:
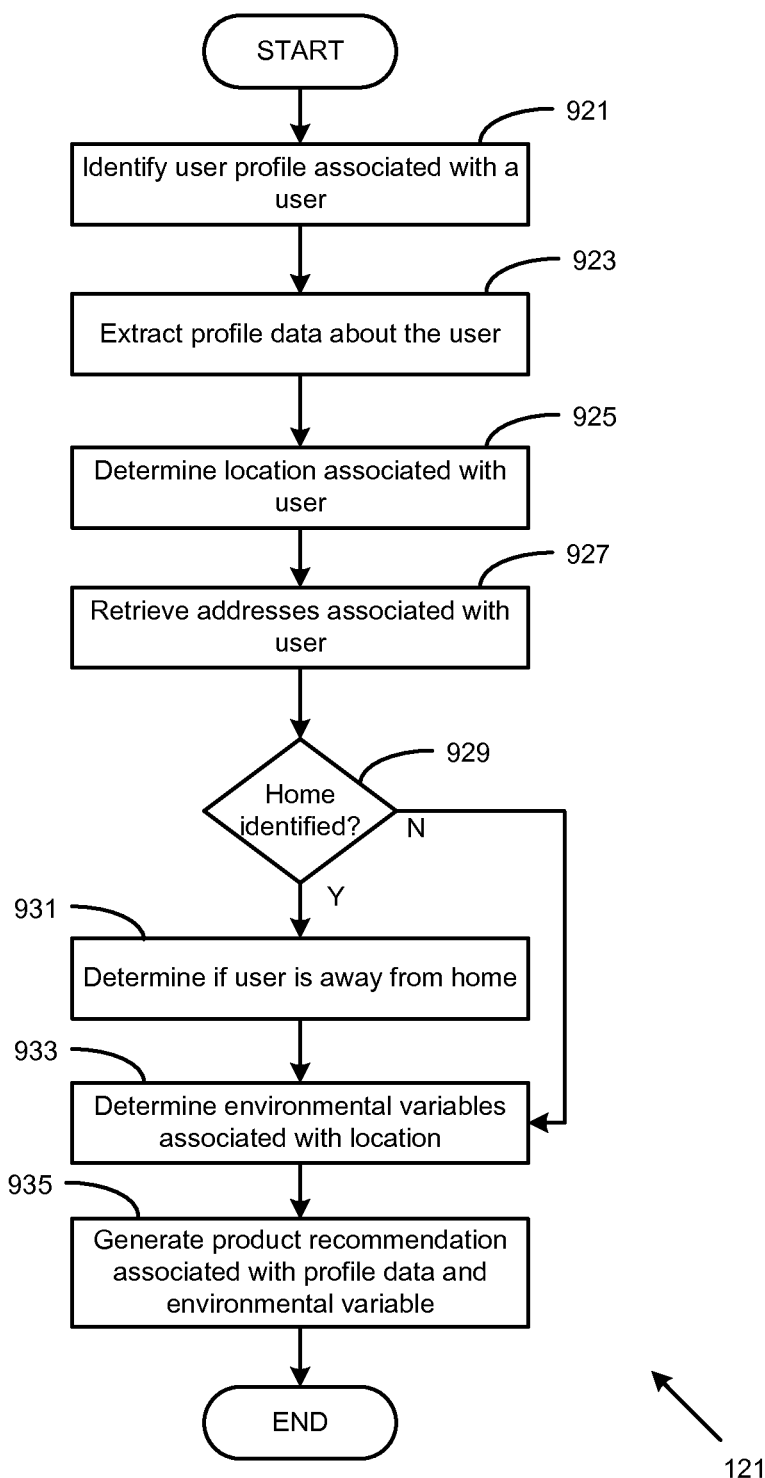
FIG. 10 is a flowchart illustrating one example of functionality implemented as portions of contextual recommendation engine executed in a computing device in the networked environment of FIG. 1 according to various embodiments of the present disclosure.

Referring next to FIGS. 8-10, shown are flowcharts that provide examples of the operation of various embodiments of the contextual recommendation engine 121 according to various embodiments. It is understood that the flowchart of FIGS. 8-10 provide merely examples of the many different types of functional arrangements that may be employed to implement the operation of the contextual recommendation engine 121 as described herein. As an alternative, the flowcharts of FIGS. 8-10 may be viewed as depicting examples of steps of methods implemented in the computing device 103 (FIG. 1) according to one or more embodiments.

With specific reference to FIG. 8, beginning with box 801, the contextual recommendation engine 121 can identify a user profile 149 associated with a user of the electronic commerce system 119. In box 803, the contextual recommendation engine 121 can extract profile data about the user. As described above, the contextual recommendation engine 121 can retrieve purchasing history, browsing history, etc., that is associated with the user in order to generate product recommendations. In box 805, the engine can determine environmental variables associated with the user in order to refine product recommendations. As noted above, the engine can retrieve information about the user from social networking systems, microblogging networks, and other data services 105 as can be appreciated. In box 807, the contextual recommendation engine 121 can generate product recommendations based upon the data retrieved from the user profile 149 as well as the environmental variables that are identified.

Referring next to FIG. 9, shown is a flowchart that provides an alternative example of the operation of a portion of the contextual recommendation engine 121 according to various embodiments. Beginning with box 901, the contextual recommendation engine 121 can identify a user profile 149 associated with a user of the electronic commerce system 119. In box 903, the contextual recommendation engine 121 can extract profile data about the user. As described above, the contextual recommendation engine 121 can retrieve purchasing history, browsing history, etc., that is associated with the user in order to generate product recommendations.

In box 905, the contextual recommendation engine 121 can determine a location associated with the user. As described above, the contextual recommendation engine 121 can identify a location of a user by retrieving location information from an API 127 of a data service 105 implementing a location based social networking service, from location detection functionality in a client 106, and/or other ways as can be appreciated. In box 907, the contextual recommendation engine 121 can determine environmental variables associated with the location of the user. As noted above, the contextual recommendation engine 121 can determine weather conditions associated with the user, events occurring in or near a location of the user, and/or retrieve other information about interests of the user from other API's 127 associated with data services 105 from which product recommendations can be generated. In box 909, product recommendations are generated based upon user profile 149 data, a location of the user, and other environmental variables.

Referring next to FIG. 10, shown is a flowchart that provides another alternative example of the operation of a portion of the contextual recommendation engine 121 according to various embodiments. Beginning with box 921, the contextual recommendation engine 121 can identify a user profile 149 associated with a user of the electronic commerce system 119. In box 923, the contextual recommendation engine 121 can extract profile data about the user. As described above, the contextual recommendation engine 121 can retrieve purchasing history, browsing history, etc., that is associated with the user in order to generate product recommendations.

In box 925, the contextual recommendation engine 121 can determine a location associated with the user. As described above, the contextual recommendation engine 121 can identify a location of the user by retrieving location information from an API 127 of a data service 105 implementing a location based social networking service, from location detection functionality in a client 106, and/or other ways as can be appreciated. In box 927, the contextual recommendation engine 121 can retrieve addresses associated with the user profile 149, and in box 929, attempt to identify a home address associated with the user. If, in box 929, a home address and/or geographic area can be identified, then in box 931 the contextual recommendation engine 121 determines whether the user is away from home, which can influence the product recommendations generated by the contextual recommendation engine 121. In box 933, environmental variables associated with the location of the user are retrieved as describe above, and in box 935 product recommendations based on the user profile 149, the location of the user, whether the user is away from home and other environmental variables are generated.

Figure 11:
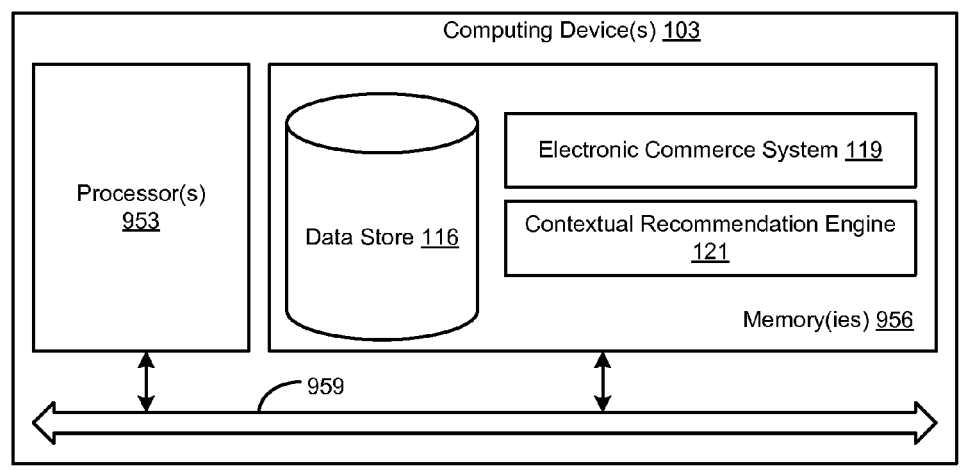
FIG. 11 is a schematic block diagram that provides one example illustration of a computing device employed in the networked environment of FIG. 1 according to various embodiments of the present disclosure.

With reference to FIG. 11, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the contextual recommendation engine 121, and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the contextual recommendation engine 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8-10 show the functionality and operation of an implementation of portions of the contextual recommendation engine 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowcharts of FIGS. 8-10 show a specific order of execution, it is understood that the order of execution may differ from that which is depicted. For example, the order of execution of two or more blocks may be scrambled relative to the order shown. Also, two or more blocks shown in succession in FIGS. 8-10 may be executed concurrently or with partial concurrence. Further, in some embodiments, one or more of the blocks shown in FIGS. 8-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the contextual recommendation engine 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that identifies a user profile associated with a user in a data store associated with an electronic commerce system;
   code that extracts profile data about the user from the user profile;
   code that identifies an address from the profile data as a home address based at least upon a threshold percentage of orders in an order history of the user having been shipped to the address;
   code that determines a location associated with the user by retrieving a location associated with the user in a location based social networking service, the location retrieved via an application programming interface provided by the location based social networking service;
   code that determines at least one environmental variable associated with the location of the user, the at least one environmental variable being at least one of: a weather condition at the location or an identity of at least one event occurring near the location;
   code that determines whether the user is away from the home address based at least in part upon the location; and
   code that generates at least one product recommendation, the at least one product recommendation being based on the profile data, the location, a determination that the user is away from the home address, and the at least one environmental variable associated with the user.

2. A system comprising:
   at least one computing device; and
   a contextual recommendation engine executable in the at last one computing device, the contextual recommendation engine comprising:
      logic that identifies a user profile associated with a user in a data store associate with an electronic commerce system;
      logic that extracts profile data about the user from the user profile by extracting at least one address from the profile data that is associated with the user;
      logic that identifies a home address associated with the user from the at least one address based at least upon determining whether a percentage of orders in an order history of the user being shipped to the at least one address meets a predefined threshold percentage;
      logic that determines whether the user is away from the home address by determining whether a client associated with the user is in a location corresponding to a geographic area that differs from the home address; and
      logic that generates at least one product recommendation in response to a determination that the user is away from the home address, the at least one product recommendation being based on the profile data and the determination that the user is away from the home address.

3. The system of claim 2, wherein the contextual recommendation engine further comprises logic that encodes for display a network page for transmission to the client, the network page containing data associated with the at least one product recommendation.

4. The system of claim 2, wherein the logic that extracts profile data about the user from the user profile further comprises logic that extracts at least one of a purchasing history or a product browsing history; wherein
   the purchasing history reflects at least a subset of purchases of the user via the electronic commerce system; and
   the product browsing history reflects at least a subset of products available via the electronic commerce system in which the user has expressed an interest.

5. The system of claim 2, further comprising logic that transmits a notification comprising the at least one product recommendation to the client associated with the user when the client associated with the user is away from the home address.

6. The system of claim 2, wherein the logic that determines whether the user is away from the home address further comprises logic that determines a current location associated with the user based at least upon one of: a network location of a client associated with the user, a location provided by location detection functionality in a client associated with the user, or a location provided by the user via a user interface element provided on a client.

7. The system of claim 6, wherein the logic that determines the location associated with the user further comprises logic that submits a request to an application programming interface (API) provided by at least one social networking service, the API configured to provide a location associated with the user.

8. The system of claim 2, wherein the logic that generates the at least one product recommendation further comprises logic that initiates a search for at least one product available via the electronic commerce system that is specific to the geographic area associated when the user is away from the home address.

9. The system of claim 2, wherein the logic that generates the at least one product recommendation further comprises logic that initiates a search for at least one product available via the electronic commerce system that is specific to weather associated with the location of the client.

10. The system of claim 2, wherein the logic that generates the at least one product recommendation further comprises logic that initiates a search for at least one product available via the electronic commerce system that is specific to at least one event occurring near the location of the client.

11. A method, comprising:
   identifying, via at least one computing device, a user profile associated with a user, the user profile being stored in a data store associated with an electronic commerce system;
   extracting, via the at least one computing device, profile data about the user from the user profile by extracting at least one address from the profile data that is associated with the user;
   identifying, via the at least one computing device, a home address associated with the user from the at least one address based at least upon determining whether a percentage of orders in an order history of the user being shipped to the at least one address meets a predefined threshold percentage;

obtaining, via the at least one computing device, a location associated with the user;

determining, via the at least one computing device, whether a client associated with the user is away from the home address associated with the user by determining whether the client is in a location corresponding to a geographic area that differs from the home address; and generating, via the at least one computer device, at least one product recommendation in response to determining that the client associated with the user is away from the home address, the at least one product recommendation being based on the profile data and the determination that the user is away from the home address.

12. The method of claim 11, wherein extracting profile data about the user from the user profile further comprises the step of extracting at least one of a purchasing history or a product browsing history; wherein the purchasing history reflects at least a subset of purchases of the user via the electronic commerce system; and the product browsing history reflects at least a subset of products available via the electronic commerce system in which the user has expressed an interest.

13. The method of claim 11, further comprising transmitting a notification comprising the at least one product recommendation to the client associated with the user when the client associated with the user is away from the home address.

14. The method of claim 11, wherein obtaining the location associated with the user further comprises determining a current location associated with the user based at least upon one of: a network location of the client associated with the user, a location provided by location detection functionality in a client associated with the user, or a location provided by the user via a user interface element provided on the client.

15. The method of claim 11, wherein determining the location associated with the user further comprises submitting a request to an application programming interface (API) provided by at least one social networking service, the API configured to provide a location associated with the user in the at least one social networking service.

16. The method of claim 11, wherein generating the at least one product recommendation further comprises initiating a search for at least one product available via the electronic commerce system that is specific to the geographic area.

17. The method of claim 16, wherein generating the at least one product recommendation further comprises initiating a search for at least one product available via the electronic commerce system that is specific to weather associated with the location of the client.

18. The method of claim 16, wherein generating the at least one product recommendation further comprises initiating a search for at least one product available via the electronic commerce system that is specific to at least one event occurring near the location of the client.

* * * * *